United States Patent [19]

Joyner

[11] Patent Number: 4,583,960

[45] Date of Patent: Apr. 22, 1986

[54] HEAVY DUTY YOKE

[75] Inventor: Robert G. Joyner, Toledo, Ohio

[73] Assignee: Dana Corporation, Toledo, Ohio

[21] Appl. No.: 602,044

[22] Filed: Apr. 19, 1984

Related U.S. Application Data

[62] Division of Ser. No. 382,036, May 26, 1982, Pat. No. 4,472,158.

[51] Int. Cl.⁴ .............................................. F16D 3/26
[52] U.S. Cl. ..................................... 464/134; 403/57
[58] Field of Search ............... 403/57, 58; 464/112, 464/134, 135, 136, 902, 905

[56] References Cited

U.S. PATENT DOCUMENTS

| 2,577,692 | 12/1951 | Slaght | 464/130 |
|---|---|---|---|
| 2,953,910 | 9/1960 | Hufstader | 464/905 X |
| 3,124,877 | 3/1964 | Macchini | 72/333 |
| 3,145,547 | 8/1964 | Lyons | 464/134 X |
| 3,159,013 | 12/1964 | Mazziotti | 464/905 X |
| 4,091,640 | 5/1978 | Olkowski, Jr. et al. | 464/134 |
| 4,192,153 | 3/1980 | Fisher | 464/134 |
| 4,472,158 | 9/1984 | Joyner | 464/134 |

FOREIGN PATENT DOCUMENTS

| 789480 | 1/1958 | United Kingdom . |
|---|---|---|
| 957511 | 5/1964 | United Kingdom . |

Primary Examiner—John M. Jillions
Assistant Examiner—Daniel P. Stodola
Attorney, Agent, or Firm—Robert M. Leonardi

[57] ABSTRACT

A heavy duty cast iron yoke (110) has two lugs (116) for receiving a journal cross and a spline body or barrel (112) defining an internal spline (114). A lug tie-in body (124) includes shoulders (128) which join the lugs (116) to the spline body (112). The internal radius (136) of the shoulders is at least 20% of the distance (134) between the internal surfaces of the lugs. An annular 15° ramp (150) is provided intermediate the outer spline body surface and the lugs.

13 Claims, 6 Drawing Figures

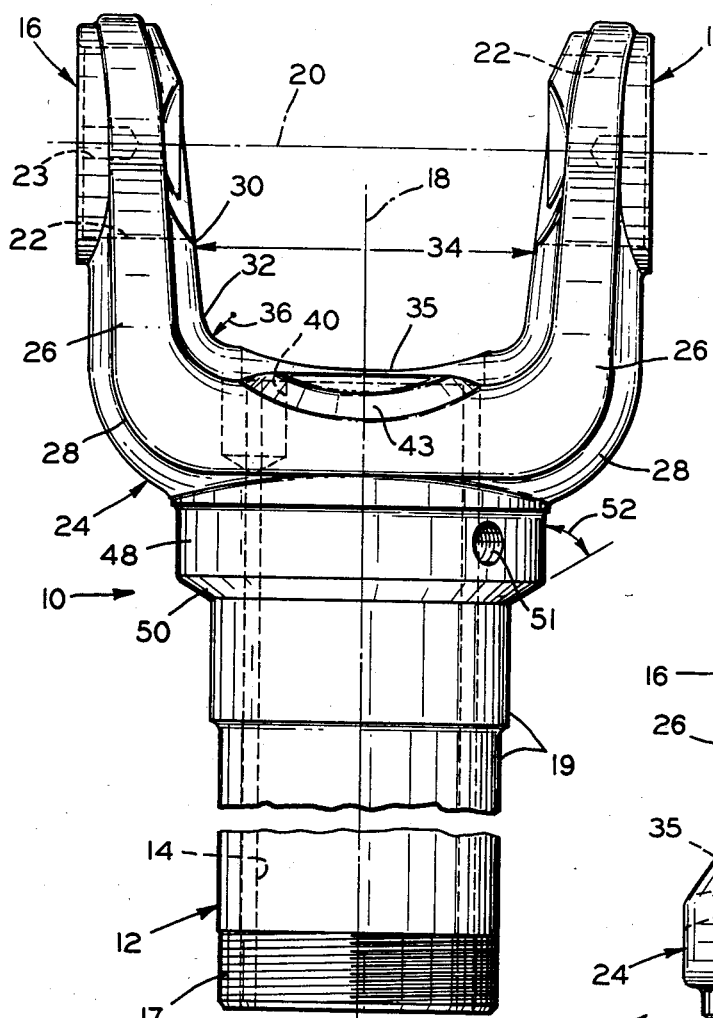
FIG. 1
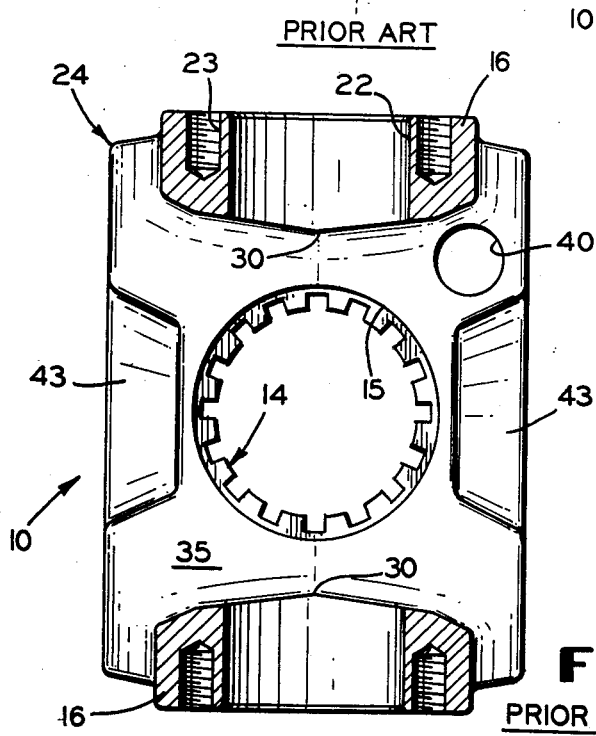
FIG. 3
PRIOR ART
FIG. 2
PRIOR ART

4,583,960

HEAVY DUTY YOKE

This application is a division of U.S. Ser. No. 382,036, filed May 26, 1982, now U.S. Pat. No. 4,472,158.

BACKGROUND OF THE INVENTION

This invention relates to universal joints in general and more specifically to universal joint yokes.

Yoke members of universal joint assemblies are typically made of forged steel because of its strength. Particularly in heavy duty models, strength and torsional stiffness are critical, as is overall weight. Forged steel is a proven reliable material which unfortunately is expensive because it requires extensive heat treating and processing.

With increasing energy costs, industry has attempted to reduce the cost of typically forged steel parts by substituting materials. Some exotic materials could be adequate substitutes, but their cost is also high. Some manufacturers have had limited success in substituting cast iron for forged steel. In the universal joint field, however, the successes have been limited to small yokes which have not been subject to great loads, torsional forces, etc.

With heavy duty components, mere substitution of cast iron has been unacceptable because of its characteristics, specifically its lower fatigue strength. Cast materials are more sensitive to stress risers, which can appear at critical areas of a component.

It is for the above reasons that industry in general is moving more toward the use of exotic materials in place of forged steel for heavy duty torsional members.

SUMMARY OF THE INVENTION

The present invention is a yoke which is capable of being constructed of materials such as cast iron. Manufacture of the yoke therefore requires less energy than prior art devices. The yoke has sufficient torsional strength and fatigue strength for use in heavy duty applications.

The yoke of the present invention includes a body defining an axially extending spline and two lugs joined to the spline body by a lug tie-in body. The lug tie-in body includes shoulders between the lugs and the spline body. In a preferred embodiment, the inner surface of the lug tie-in body has a radius of between 20% and 50% of the distance between the lugs. In a preferred slip yoke, the spline body is a barrel and the lug tie-in body includes an annular transition surface between the shoulders and the barrel, the transition surface having an angle of less than 45° relative to the barrel axis.

BRIEF DESCRIPTION OF THE DRAWINGS

FIG. 1 illustrates a front view of a prior art slip spline yoke;

FIG. 2 illustrates a side view of the prior art yoke of FIG. 1;

FIG. 3 illustrates a top view of the prior art yoke of FIGS. 1 and 2;

DETAILED DESCRIPTION OF A PRESENTLY PREFERRED EMBODIMENT

Figure 4:
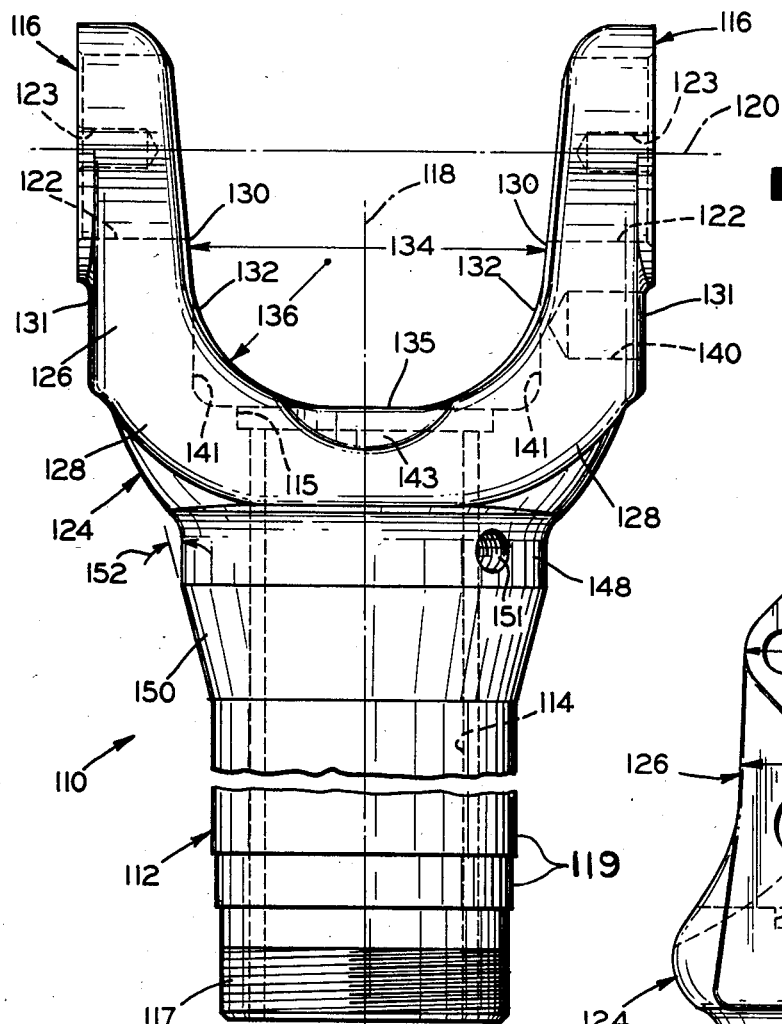
FIG. 4 illustrates a front view of a slip spline yoke designed in accordance with the present invention.

To fully understand and appreciate the present invention, it is necessary to understand typical prior art devices. FIGS. 1, 2, and 3 illustrate a typical prior art heavy duty forged steel slip spline yoke 10. The yoke includes a hollow spline body or barrel shown generally at 12 having a spline 14 extending axially therethrough. The yoke 10 has a longitudinal axis 18 about which it is rotatable. The barrel 12 accepts a tube shaft (not shown) having a mating spline for rotatably drivingly and axially slidably engaging the spline 14. The barrel 12 has a first end 17 which is externally threaded to accept a threaded dust cap (not shown) which seals against the tube shaft, as is well known in the art. The external mid-portion of the barrel 12 includes outer cylindrical surfaces 19 which may or may not be slightly stepped due to simultaneous external machining of the barrel with two cutting tools. If either cylindrical section 19 has a smaller diameter than the other, it is usually the threaded end 17.

Opposite the threaded end 17, the yoke includes two symmetrically and radially spaced lugs 16. Each lug contains a bearing cross bore 22 for receiving a journal cross trunnion. As is more clearly seen in FIG. 2, the external surface of the lugs 16 contain tapped holes 23 for receiving cap screws which hold a bearing outer race.

The lugs 16 are attached to the barrel 12 through a lug tie-in body 24 which includes two necks 26, one joined to each lug 16, two shoulders 28, one joined to each neck 26, a zerk or transition surface 48 adjacent the shoulders 28, and a ramp 50 joining the zerk surface to the barrel 12. The conically shaped ramp 50 is typically disposed at an angle 52 relative to the yoke axis 18 of about 60°. The zerk surface 48 includes a tapped lubrication port 51 for receiving a zerk fitting. Referring to FIG. 2, it can be seen that the neck portions 26 are of a width 38 which is less than the width 39 of the lugs 16.

Each lug 16 has an inner surface 30 immediately and directly below its respective bearing cross hole 22. The distance between these surfaces 30 through a plane perpendicular to the axis 18 is denoted by reference numeral 34 in FIG. 1. The lug tie-in body 24 defines an inner surface comprising inner lug tie-in surfaces 32 each of which extend from a lug inner surface 30 to a floor 35 which joins the two lug tie-in surfaces 32. The inner surface of the lug tie-in body 24 also defines opposed notches 43 symmetrically spaced between the lugs 16. The notches 43 are relief areas to allow maximum universal joint angles, as is well known in the art. The floor 35 is relatively flat and includes a balance hole 40, which is a drill hole strategically positioned in the yoke to rotationally balance the yoke 10 about the axis 18. The floor 35 further defines a counterbore 15 for receiving a dust cap (not shown) which protects the splines 14 from dust and fragments.

The lug tie-in surfaces 32 define a relatively small surface radius 36 between the inner lug surfaces 30 and the floor 35. The radius 36 is traditionally relatively small to allow a relatively large, flat floor 35 to accommodate balance holes such as 40. A large radius 36 has traditionally been avoided because of the difficulty of drilling balance holes in a curved surface.

The zerk surface 48 is cylindrical and has a relatively large diameter to space the lubrication fitting from the spline 14. Zerk surface 48 is also given a large diameter because it is a high stress area and because the stress problems are compounded with a zerk hole 51, which creates fatigue problems. Furthermore, the zerk area is a high stress area because the associated stub shaft usually terminates in this general area and thereby acts as a lever directly under the zerk surface.

Figure 5:
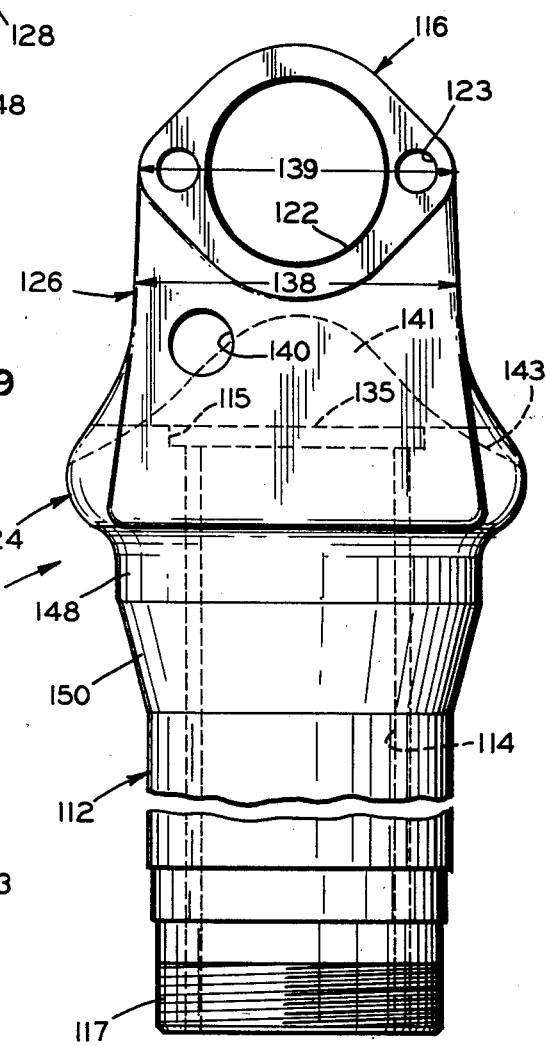
FIG. 5 illustrates a side view of the slip spline yoke of FIG. 4.
Figure 6:
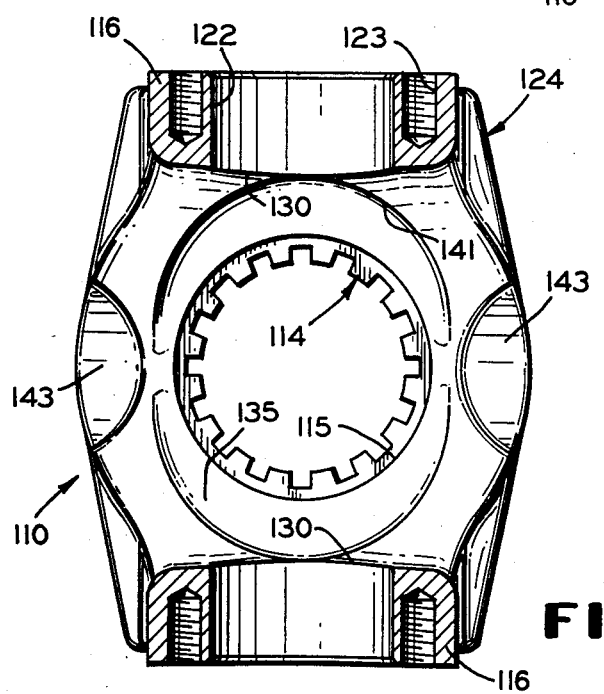
FIG. 6 illustrates a top view of the slip spline yoke of FIGS. 4 and 5.

A preferred embodiment of the present invention is shown in FIGS. 4, 5, and 6. Referring to FIG. 4, slip yoke 110 includes a hollow barrel 112 with a spline 114 and is rotatable about longitudinal axis 118. The barrel has outer cylindrical surfaces 119, one of which is threaded at end 117.

Yoke 110 includes two lugs 116, each containing a bearing cross bore 122 and cap screw holes 123. The lugs 116 are thicker than the lugs of a typical forged steel yoke to provide additional torsional strength. The lugs are attached to the barrel through a lug tie-in body 124 which includes necks 126, shoulders 128, a zerk surface 148 which includes a lubrication port 151, and a ramp 150.

The ramp 150 is disposed at an angle 152 of 15° relative to the barrel axis 118. It has been found that a gradually sloped ramp such as 150 helps eliminate stress risers which may occur between the zerk surface 148 and the barrel 12. While a 15° ramp is presently preferred, ramps having angles less than about 45° may give similar benefits in other applications. An additional benefit of the present design is that the gradually sloped ramp 150 provides an ideal area for pouring the yoke casting.

Each lug 116 has an inner surface 130 immediately and directly below its bearing cross hole 122. The distance between these surfaces 130 through a plane perpendicular to the axis 118 is denoted by reference numeral 134. The lug tie-in body 124 has an inner surface comprising inner lug tie-in surfaces 132, each of which extend from a lug inner surface 130 to a floor 135 which joins the two lug tie-in surfaces 132. The floor 135 contains no balancing holes, such as 40, because it would be difficult to bore such holes in the curved inner surfaces 132 of the lug tie-in body. The floor 135 has counterbore 115 for receiving a dust cap (not shown). The inner surface of lug tie-in body 124 further defines opposed notches 143 to allow maximum angles between opposed yoke members.

Each lug tie-in surfaces 132 has a large surface radius 136, between the corresponding inner lug surface 130 and the floor 135. The radius 136 is between 20% and 50% of the distance 134. A large radius 136 enhances the lug tie-in body and strengthens the attachment to the barrel. It also helps in centrifugal stiffness and in fatigue strength. In a preferred embodiment the radius 136 is 24% of the distance 134. If the radius 136 equals 50% of the distance 134, the surfaces 132 will form a single curved surface between the areas 130. Radii 136 greater than 50% of the distance 134 is undesirable because it will create notches between the surfaces 130 and 135. Because of the large radius 136, it is necessary to provide a relatively flat eliptical area 141 (see FIG. 6) for the dust cap counterbore 115.

Referring to FIG. 5 it can be seen that the width 138 of ther neck 126 is at least as great as the width 139 of the lugs 116. The large width 138, together with the increased thickness, adds radial and torsional stiffness and creates a lug 116 which is more capable of controlling torsional forces. The present invention permits the use of cast iron in very large yokes which heretofore could not withstand stresses.

A balance hole 140 is drilled through the outside surface 131 of one of the lugs 116. The additional width 138 of neck 126 provides sufficient area to permit balance holes to exist without unduly weakening the lug. Although the specific gravity of cast iron is only about 90% as dense as forged steel, balance hole 140 can be as effective as a balance hole 40 in the floor in a prior art yoke because balance hole 140 is radially spaced a greater distance from the yoke axis 118.

The present invention allows the substitution of cast iron for the yoke 110 in place of forged steel. While the cast iron yoke 110 is more massive than prior art forged steel yokes, its weight is no greater than such steel yokes because the specific gravity of cast iron is about 90% that of forged steel. The cast iron weighs approximately 0.256 pounds per cubic inch, while forged steel weighs approximately 0.283 pounds per cubic inch.

The cast iron material used for yoke 110 is a pearlitic modular (ductile) iron used as cast (SAE material specification D7003 [modified]). The cast iron has a tensile strength of 100,000 PSI and a yield strength of 70,000 PSI. Its elongation factor in 2 inches is 3–5% and its elastic modulus is 22–24 $\times 10^6$ PSI. The material has a Rockwell hardness of C20-30 and a Brinell hardness of 229–285 BHN. The cast iron is sufficiently hard for machining.

Although the above description of a preferred embodiment refers to slip yokes only, certain aspects of the present invention may be utilized in other universal joint components, such as end yokes, in which the spline body is not a barrel. Other modifications of the invention are possible without departing from the scope of the invention as defined in the following claims.

What is claimed is:

1. A cast metal slip yoke comprising:
   a barrel rotatable about an axis and having an axially extending spline for engagement with a mating spline of an associated apparatus;
   two axially extending lugs symmetrically positioned about said barrel axis, each of said lugs defining a bearing cross hole extending therethrough transversely to said axis, said bearing cross holes being aligned;
   a lug tie-in body joining each of said lugs to said barrel, said body comprising two neck portions, each of said neck portions joined to one of said lugs, respectively, and two shoulder portions, each of said shoulder portions joining one of said neck portions, respectively, to said barrel;
   wherein said body further comprises an annular transition surface between said shoulder portions and said barrel, said transition surface having a greater diameter than said barrel, wherein said body further comprises an annular ramp joining said transition surface and said barrel, wherein said ramp is disposed at an angle to the barrel axis of less than 45°.

2. A slip yoke as defined in claim 1 wherein said slip yoke is constructed of cast iron.

3. A slip yoke as defined in claim 1 wherein said slip yoke is constructed of pearlite modular, ductile, cast iron.

4. A slip yoke as defined in claim 1 wherein said annular transition surface defines a lubrication port.

5. A slip yoke as defined in claim 1 wherein said ramp is disposed at an angle to the barrel axis of about 15°.

6. A slip yoke as defined in claim 1 wherein said barrel has a stepped outer cylindrical surface.

7. A slip yoke as defined in claim 6 wherein said outer cylindrical barrel surface positioned furthest from said transition surface has a smaller diameter than said outer cylindrical barrel surface closest to said transition surface.

8. A slip yoke as defined in claim 1 wherein said slip yoke is comprised of cast iron having a tensile strength of about 100,000 psi.

9. A slip yoke as defined in claim 8 wherein said cast iron has a yield strength of about 70,000 psi.

10. A slip yoke as defined in claim 9 wherein said cast iron has an elongation factor in two inches of about 3-5%.

11. A slip yoke as defined in claim 10 wherein said cast iron has an elastic modulus of about $22-24 \times 10^6$ psi.

12. A slip yoke as defined in claim 11 wherein said cast iron has a Rockwell hardness of about C20 to 30.

13. A slip yoke as defined in claim 12 wherein said cast iron has a Brinell hardness of about 229 to 285 BHN.

* * * * *